US 8,276,280 B2

(12) United States Patent
Lee et al.

(10) Patent No.: US 8,276,280 B2
(45) Date of Patent: Oct. 2, 2012

(54) ELECTROMOTION TRIM SCISSORS

(75) Inventors: Kyung Suk Lee, Seoul (KR); Hyo Cher Kim, Hwaseong-si (KR); Hye Seon Chae, Suwon-si (KR); U Suk Park, Suwon-si (KR); Kyung Ran Kim, Suwon-si (KR); Ki Hwan Jin, Wonju-si (KR); Kwan Woo Kim, Suwon-si (KR); Yoon Jeong Baek, Yongin-si (KR); Dae Sop Lim, Yeosu-si (KR); Soon Yean Jung, Seoul (KR)

(73) Assignee: Republic of Korea (Management: Rural Development Administration), Gyeonggi-Do (KR)

( * ) Notice: Subject to any disclaimer, the term of this patent is extended or adjusted under 35 U.S.C. 154(b) by 480 days.

(21) Appl. No.: 12/539,423

(22) Filed: Aug. 11, 2009

(65) Prior Publication Data
US 2010/0064527 A1    Mar. 18, 2010

(30) Foreign Application Priority Data
Sep. 16, 2008   (KR) ..................... 10-2008-0090800
Jun. 12, 2009   (KR) ..................... 10-2009-0052220

(51) Int. Cl.
*B26B 13/00*    (2006.01)
*B26B 15/00*    (2006.01)
*H01H 3/02*    (2006.01)
*H01H 9/00*    (2006.01)

(52) U.S. Cl. ............. 30/228; 30/194; 200/505; 335/205
(58) Field of Classification Search .................... 30/194, 30/228, 249, 247, 197, 241; 200/505, 329, 200/332.2, 334, 17 R; 335/205–207; 338/32 R–32H
See application file for complete search history.

(56) References Cited

U.S. PATENT DOCUMENTS

| | | | | |
|---|---|---|---|---|
| 2,600,540 A * | 6/1952 | Johnson | ..................... | 47/1.01 R |
| 3,178,816 A * | 4/1965 | Schmid | ........................... | 30/228 |
| 3,571,544 A * | 3/1971 | Sheehan | ....................... | 335/205 |
| 5,034,847 A * | 7/1991 | Brain | ........................... | 362/205 |
| 5,224,474 A * | 7/1993 | Bloomfield | ............. | 128/201.19 |
| 5,675,094 A * | 10/1997 | Klauber et al. | .......... | 73/862.191 |
| 5,708,216 A * | 1/1998 | Garshelis | ................. | 73/862.335 |
| 5,729,416 A * | 3/1998 | Renkes et al. | .................. | 361/23 |
| 5,826,341 A * | 10/1998 | Massa | ............................. | 30/247 |
| 6,044,564 A * | 4/2000 | Jeltsch | ........................... | 30/228 |
| 6,260,423 B1* | 7/2001 | Garshelis | ................. | 73/862.336 |
| 6,863,165 B2* | 3/2005 | Koslowski | .................... | 192/48.2 |
| 6,892,826 B2* | 5/2005 | Giardino | .......................... | 173/1 |
| 6,936,789 B2* | 8/2005 | Hanzel | .......................... | 219/132 |
| 7,496,460 B2* | 2/2009 | Hornick et al. | ................. | 702/64 |
| 2002/0048166 A1* | 4/2002 | Matsunaga | ................... | 362/119 |
| 2007/0108944 A1* | 5/2007 | Pellenc | ......................... | 320/130 |

* cited by examiner

*Primary Examiner* — Ghassem Alie
*Assistant Examiner* — Bharat C Patel
(74) *Attorney, Agent, or Firm* — Frommer Lawrence & Haug LLP; Ronald R. Santucci

(57) ABSTRACT

The present invention provides electric pruning shears which can improve operation convenience by increasing the operating speed and eliminating hand fatigue during pruning of fruit trees.
For this purpose, the present invention provides electric pruning shears which can improve safety during handling by implementing a new type of switching means having a separate safety switch capable of being separated from a main body and put on a user's finger and reduce the volume and weight by reducing the number of parts associated with the safety switch. Moreover, the present invention provides electric pruning shears which control a motor to be reversely rotated when there is an abnormality in blades of the electric pruning shears during a pruning operation, thus escaping from the overall abnormality including motor damage.

12 Claims, 6 Drawing Sheets

ELECTROMOTION TRIM SCISSORS

CROSS-REFERENCE TO RELATED APPLICATION

This application claims under 35 U.S.C. §119(a) the benefit of Korean Patent Application Nos. 10-2009-0052220 and 10-2008-0090800, respectively filed Jun. 12, 2009 and Sep. 16, 2008, the entire contents of which are incorporated herein by reference.

BACKGROUND (a) Technical Field

The present invention relates to electric pruning shears, and more particularly, to electric pruning shears which can improve operation convenience by increasing the operating speed and eliminating hand fatigue during pruning of fruit trees.

(b) Background Art

In general, pruning shears, saws or knives are used to prune branches of fruit trees and various gardening, forestry, or floricultural products.

Since the operation of typical pruning shears depends on only a worker's labor, it takes a lot of time, and the working capability is reduced.

To solve these problems, various types of electric pruning shears that operate based on a driving force of a motor have been developed and used.

Blades of these electric pruning shears include a fixed blade fixed to a body of the electric pruning shears and a movable blade. The movable blade repeatedly moves within a predetermined distance with respect to a rotation shaft formed on the fixed blade, thus performing a pruning operation together with the fixed blade.

The movement of the movable blade is repeatedly made by the rotational force of the motor without condition.

Recently, portable electric pruning shears capable of being used for a predetermined time with a one time charge and conveniently handled have attracted much attention, and these portable electric pruning shears are gradually miniaturized and lightweight.

Moreover, stability as well as functionality is added to these electric pruning shears, and thus an additional safety switch is included to ensure safety during handling in addition to an operating switch. As a result, the volume and weight of the electric pruning shears are increased, which is disadvantageous in miniaturization and lightweight of the electric pruning shears.

Moreover, in the case where a user tries to cut a large branch of a tree, which requires a driving force greater than the motor's full load, using the conventional electric pruning shears, the blades of the pruning shears may not cut the branch.

In this case, the pruning operation will not be possible any longer. And, since the motor is being overloaded, other parts associated with the motor may be damaged.

A fuse may be used to prevent such a situation from occurring; however, this method cannot eliminate the inconvenience of the user.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

Accordingly, the present invention provides electric pruning shears including a new type of switching means having a separate safety switch capable of being separated from a main body and put on a user's finger. Moreover, the present invention provides electric pruning shears which control a motor to be reversely rotated when there is an abnormality in blades of the electric pruning shears during a pruning operation, thus escaping from the overall abnormality including motor damage.

In one aspect, the present invention provides electric pruning shears including a fixed blade and a movable blade and performing a pruning operation by operating the movable blade by a driving force of a motor, the electric pruning shears including: a contact switch installed on one side of a main body to operate the motor and including a movable contact and a fixed contact; and a portable operating switch having a ring shape capable of being put on a user's finger and including a magnet to operate the motor by connecting the movable contact and the fixed contact of the contact switch by a magnetic force of the magnet.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Hereinafter, preferred embodiments of the present invention will be described in detail with reference to the accompanying drawings.

Figure 1:
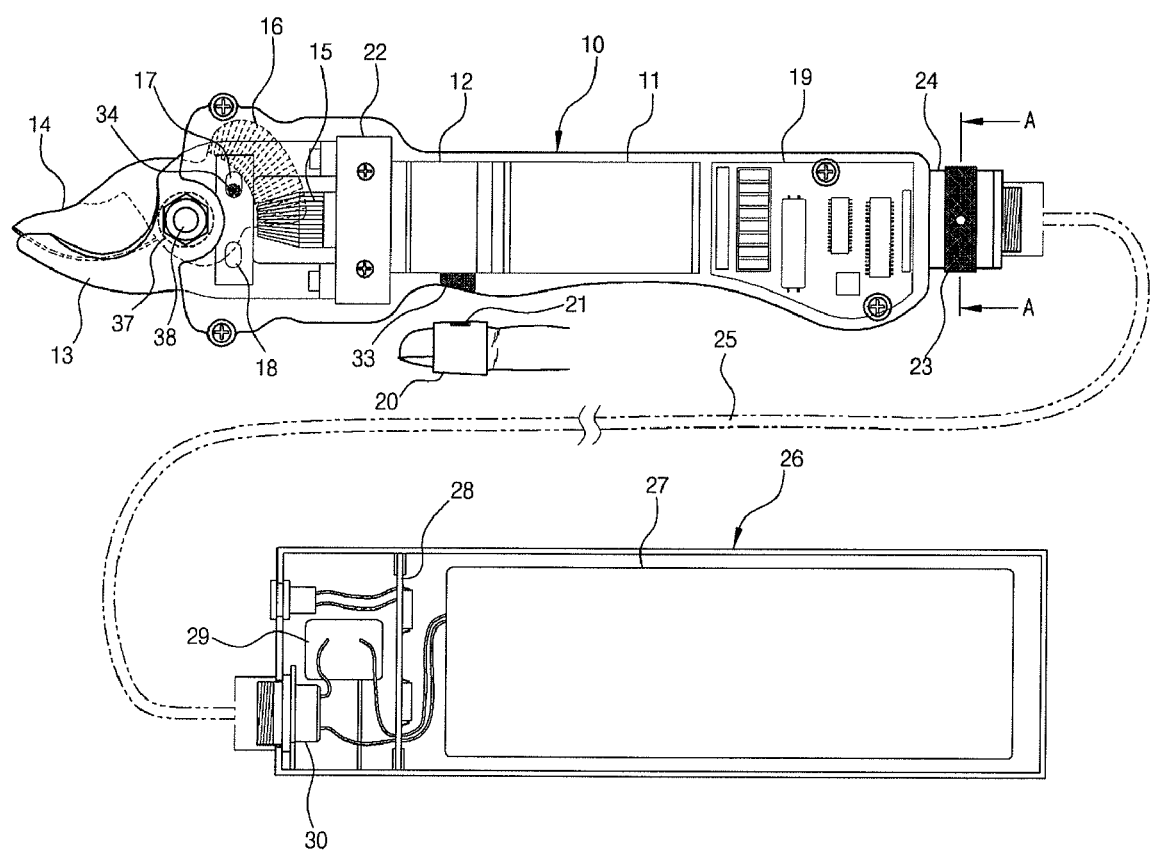
FIG. 1 is a diagram showing a closed state of electric pruning shears in accordance with an embodiment of the present invention.
Figure 2:
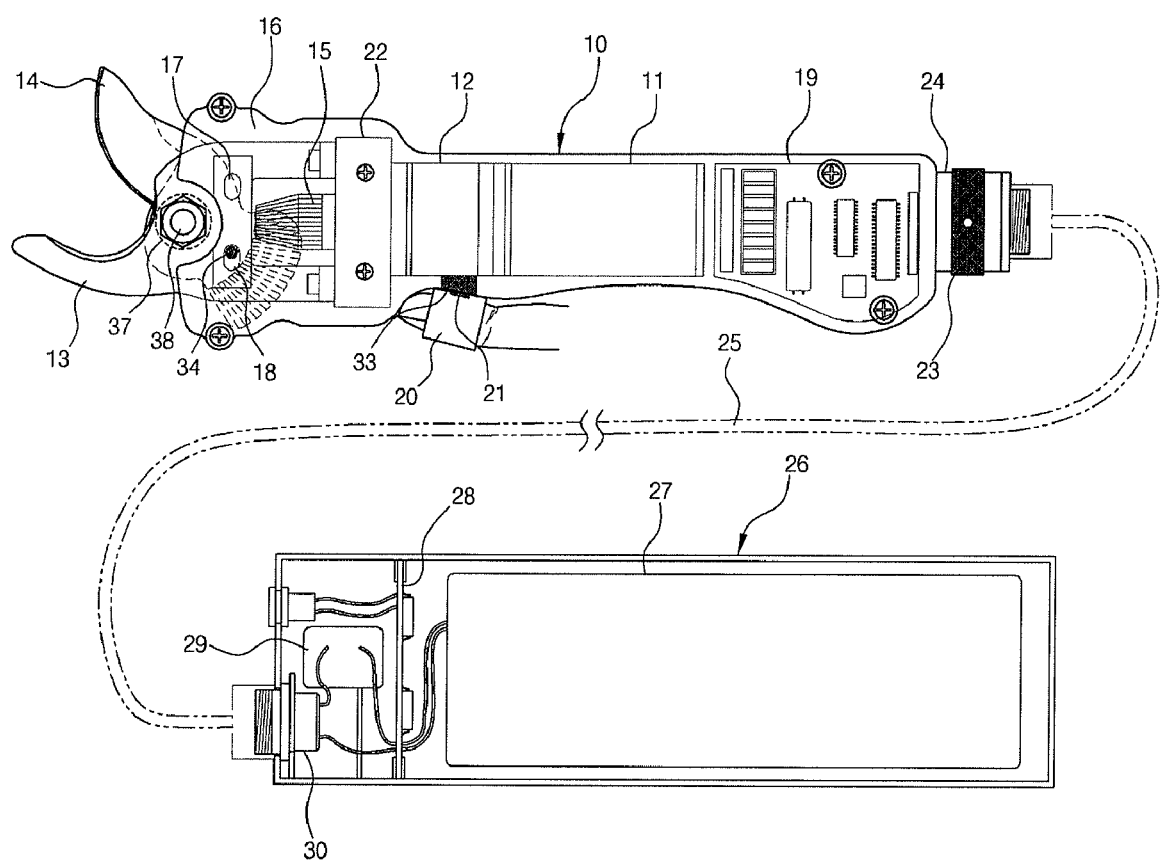
FIG. 2 is a diagram showing an opened state of the electric pruning shears of FIG. 1.

FIG. 1 is a diagram showing a closed state of electric pruning shears in accordance with an embodiment of the present invention, and FIG. 2 is a diagram showing an opened state of the electric pruning shears of FIG. 1.

The electric pruning shears in accordance with an embodiment of the present invention includes a drive means including a motor 11 and a decelerator 12, a fixed blade 13 and a movable blade 14, which substantially perform a pruning operation, a controller 19 and a power supplier 26, which control the operation of the motor 11, and a portable operating switch 20 for on/off operation of the motor 11.

The drive means serves to move the movable blade 14 by a driving force generated by gear combination between the motor 11 and the decelerator 12, and the pair of the fixed blade 13 and the movable blade 14 perform the pruning operation.

The controller 19 controls power supplied to the drive means such that the motor 11 can be rotated in both forward and reverse directions, and the power supplier 26 supplies power for operation of the motor 11.

The power supplied from the controller 19 and the power supplier 26 may be applied from a rechargeable battery or from the outside.

Moreover, the controller 19 and the power supplier 26 determine whether there is an abnormality during a pruning operation and, if there is an abnormality, control the movable blade 14 to be reversely operated by changing the phase of the power supplied to drive means such that the entire pruning shears including the motor 11 of the drive means can escape from the abnormality.

Therefore, the electric pruning shears can detect by itself an abnormality such as an overload occurring during the pruning operation. If an overloaded state is detected, the pruning operation is stopped and the movable blade 14 is reversely operated by the reverse rotation of the motor 11, thus preventing the motor 11 and its electrical circuit from being damaged.

Especially, the portable operating switch 20 is formed separately from a main body 10 of the electric pruning shears so as to be put on a user's finger only during the use of the electric pruning shears.

For example, when the portable operating switch 20 put on the finger is brought into a contact switch 33 mounted in the main body 10, the contact switch 33 is turned on, thus operating the motor 11.

This structure means that a conventional safety switch and its peripheral parts are eliminated from the main body 10, and thus it is possible to significantly reduce the overall volume and weight of the electric pruning shears.

The structure of the electric pruning shears will be described in more detail below.

The motor 11 and the decelerator 12, which are directly connected to each other, are mounted in the main body 10 of the electric pruning shears. In this case, the motor 11 is operated or stopped when the power is supplied or cut off by the on/off operation of the contact switch 33 installed on one side of the main body 10.

Here, the motor 11 can be rotated in both forward and reverse directions. In detail, the motor 11 repeats the forward and reverse rotations when the contact switch 33 is turned on and the movable blade 14 repeats the opening and closing operations, thus performing the pruning operation.

The upper end of the main body 10 surrounds a gear portion 16 of the movable blade 14 and a leg portion of the fixed blade 13 such that the movable blade 14 and the fixed blade 13 can be opened, and a rectangular support block 22 is installed in the upper end of the main body 10. In this case, the leg portion of the fixed blade 13 is supported by the support block 22, and a shaft portion of a drive gear 15 for driving the movable blade 14 is supported by the support block 22.

That is, the drive gear 15 is rotatably supported by a plurality of bearings in the support block 22, and the shaft portion of the thus supported drive gear 15 is connected to a shaft of the decelerator 12 to receive the rotational force of the motor 11 through the decelerator 12.

The fixed blade 13 and the movable blade 14, which substantially perform the pruning operation, are supported on the upper end of the support block 22.

For example, both leg portions of the fixed blade 13 are connected to the upper end of the support block 22 such that the support block 22 serves as a support, and the movable blade 14 arranged to face the fixed blade 13 is fixed on one side of the fixed blade 13 by a hinge pin 38.

Therefore, the movable blade 14 rotates with respect to the hinge pin 38 as a central axis and performs the pruning operation together with the fixed blade 13.

The fan-shaped gear portion 16 is integrally formed on one side of the rear end of the movable blade 14 for the movement of the movable blade 14. In this case, the gear potion 16 is engaged with the drive gear 15 of the motor 11 and the decelerator 12 such that the movable blade 14 is rotated by the gear transmission with the drive gear 15.

Figure 3:
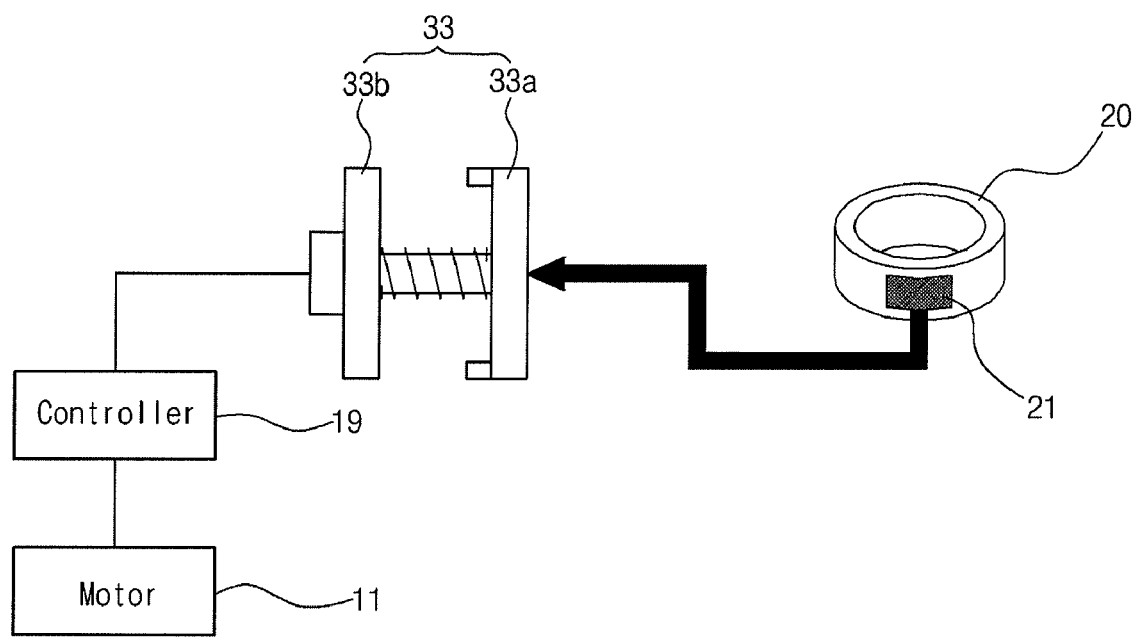
FIG. 3 is a schematic diagram showing the operation of a contact switch of FIG. 1.

FIG. 3 is a schematic diagram showing the operation of the contact switch 33 of FIG. 1.

An embodiment of the present invention provides the contact switch 33 as a means for controlling the power supplied to the motor 11, and the contact switch 33 includes a movable contact 33a and a fixed contact 33b, which are installed on one side of the main body 10.

The movable contact 33a is elastically supported by a return spring such that it can be detached from the fixed contact 33b by restoration force of the return spring when no external force, e.g., no magnetic force is applied. In this case, the contact switch 33 is turned off, and thus power is not supplied to the motor 11.

On the contrary, when external force, e.g., magnetic force is applied, the movable contact 33a is pulled by the magnetic force and attached to the fixed contact 33b. In this case, the contact switch 33 is turned on, and thus power is supplied to the motor 11.

The portable operating switch 20 that serves as an operation switch and a safety switch for the use of the electric pruning shears provided by the present invention has a ring shape capable of being put on the user's finger.

Moreover, since the portable operating switch 20 is formed of fabric material capable of stretching like an elastic band, it is not easily removed from the finger even though it is put on any finger but provides a comfortable wearing feeling.

A magnet 21 is mounted in the portable operating switch 20 such that the movable contact 33a of the contact switch 33 is moved and attached to the fixed contact 33b by a magnetic force generated by the magnet 21.

When the magnet 21 of the portable operating switch 20 is brought into contact with the contact switch 33 located at the main body 10, the movable contact 33a formed of metal is pulled and attached to the fixed contact 33b, and thus the controller 19 receives an ON signal of the contact switch 33 and supplies power to the motor 11.

Figure 4:
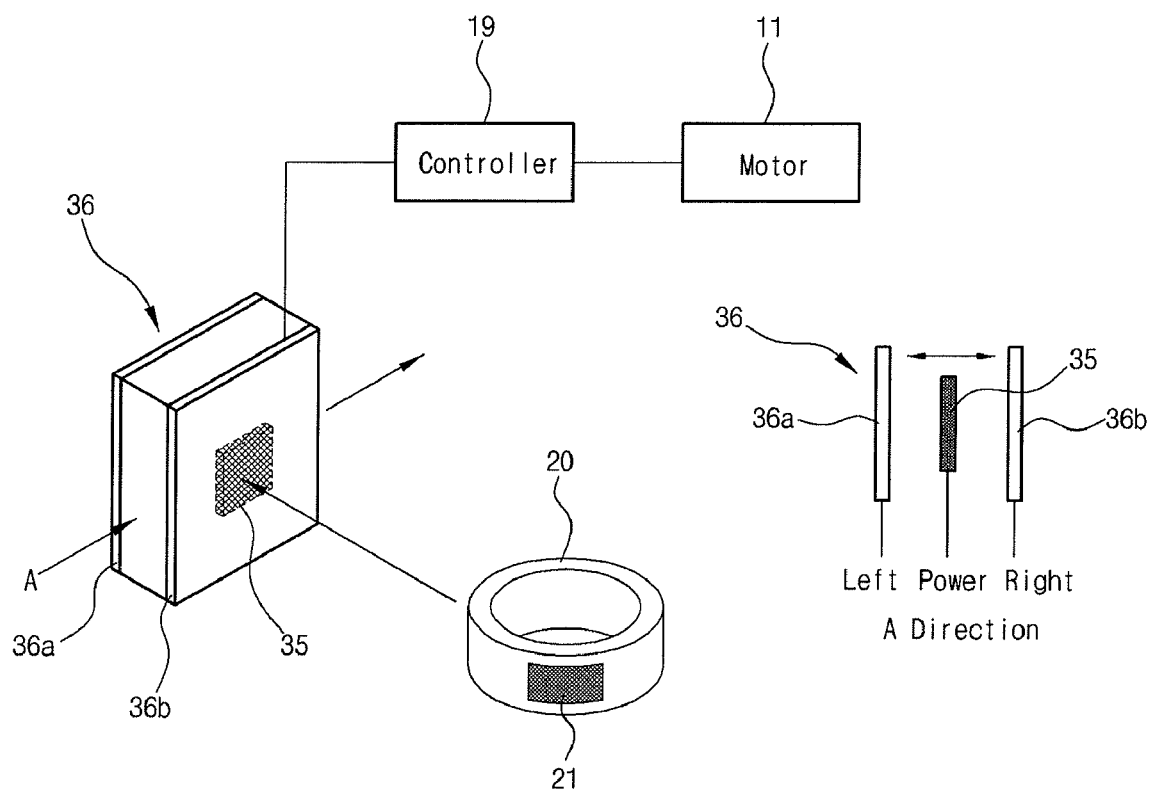
FIG. 4 is a schematic diagram showing the operation of a hall sensor switch in accordance with another embodiment of the present invention.

FIG. 4 is a schematic diagram showing the operation of a hall sensor switch in accordance with another embodiment of the present invention.

Another embodiment of the present invention may provide a hall sensor switch 36 instead of the contact switch 33.

A valve 35 formed of a conductive material is mounted in the hall sensor switch 36 such that, when the magnet 21 approaches the hall sensor switch 36, the valve 35 is pulled to the right or left by the magnetic field. As a result, the valve 35 is attached to one of two plates 36a and 36b to generate an electrical signal (ON signal). At this time, the controller 19 receives the electrical signal (ON signal) and supplies power to the motor 11.

As such, since the portable operating switch 20 is formed separately from the main body 10 of the electric pruning shears, it is possible to significantly reduce the overall volume and weight of the conventional electric pruning shears, and further it is possible to prevent safety accident from occurring when a child, who does not know how to operate the conventional electric pruning shears including an operating switch mounted in the main body and plays with the electric pruning shears, touches the operating switch.

Especially, the present invention provides a means for preventing the motor 11 from being overloaded, and thus it is possible to prevent the motor 11 or electrical wiring from being damaged.

For this purpose, a sensor 37 is installed around the hinge pin 38 connected to combine the fixed blade 13 and the movable blade 14 to detect a load applied to the movable blade 14 in the case where the movable blade 14 is stuck into a branch of a tree during the pruning operation and the motor 11 is continuously operated.

Here, the sensor 37 may be a sensing means such as a load cell or torque limit capable of detecting the magnitude of a load as an electrical signal by measuring the change in resistance of a strain gauge.

The controller 19 and the power supplier 26 can control the operation of the motor 11 based on switching signals of the portable operating switch 20 and the contact switch 33. In the case where an abnormality occurs in the electric pruning shears such as an overload applied to the motor 11 operating in the forward direction to perform a normal pruning operation, that is, when a load value greater than a predetermined set value is detected by the sensor 37 and input to the controller 19 and the power supplier 26, the controller 19 and the power supplier 26 control the motor 11 to be reversely rotated by changing the phase of the power supplied to the motor 11 such that the drive gear 15 is reversely operated, thereby escaping from the abnormality.

Here, as the method of connecting the sensor 37 to the movable blade 14, obtaining a detection signal from the sensor 37 being interlocked with the movable blade 14, and outputting an appropriate control signal with respect to the motor 11 by processing the set value and the load value, any method commonly known in the art may be used without limitation.

As another example, the controller 19 and the power supplier 26 detect the current of power supplied to the motor 11 to determine whether it is within a predetermined range, thus determining whether the motor 11 is in an overloaded state.

In addition, the method in which the controller 19 and the power supplier 26 detect the overloaded state of the motor 11 may be implemented in various ways such as detecting the voltage of direct current supplied to the motor 11.

The controller 19 controls the overall operation of the motor 11, and the power supplier 26 supplies power to the motor 11.

As the controller 19, a printed circuit board, widely known in the art, may be used. In this case, the printed circuit board is electrically connected to the sensor 37, the contact switch 33 or the hall sensor switch 36, first and second hall sensors 17 and 18, which will be described later, and the motor 11, and thus electrical control is achieved.

Moreover, since the controller 19 in accordance with an embodiment of the present invention is a downsized and lightweight printed circuit board installed in the main body 10, substantially at the bottom of the motor 11, the overall volume and weight are reduced compared to a conventional control box separated from the main body 10, and thus the pruning operation and transport are facilitated.

The power supplier 26 is formed separately from the main body 10 and includes a battery 27, a substrate (PCB) 28, and a relay 29, which are mounted in a case. In this case, the controller 19 and the power supplier 26 are connected via a cable 25 and a connection jack 30.

Figure 5:
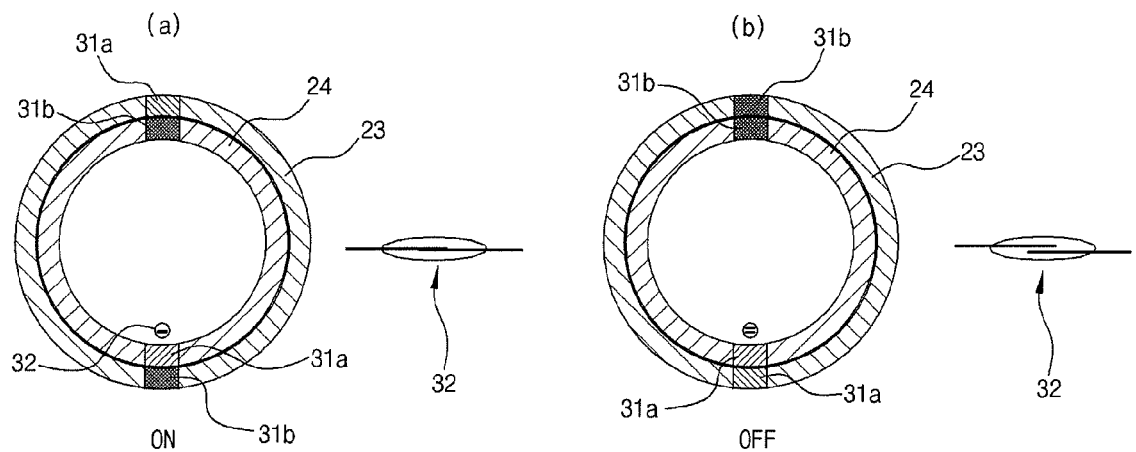
FIG. 5 is a cross-sectional view taken along line A-A of FIG. 1 for illustrating an on/off operation of a safety means of FIG. 1.
Figure 6:
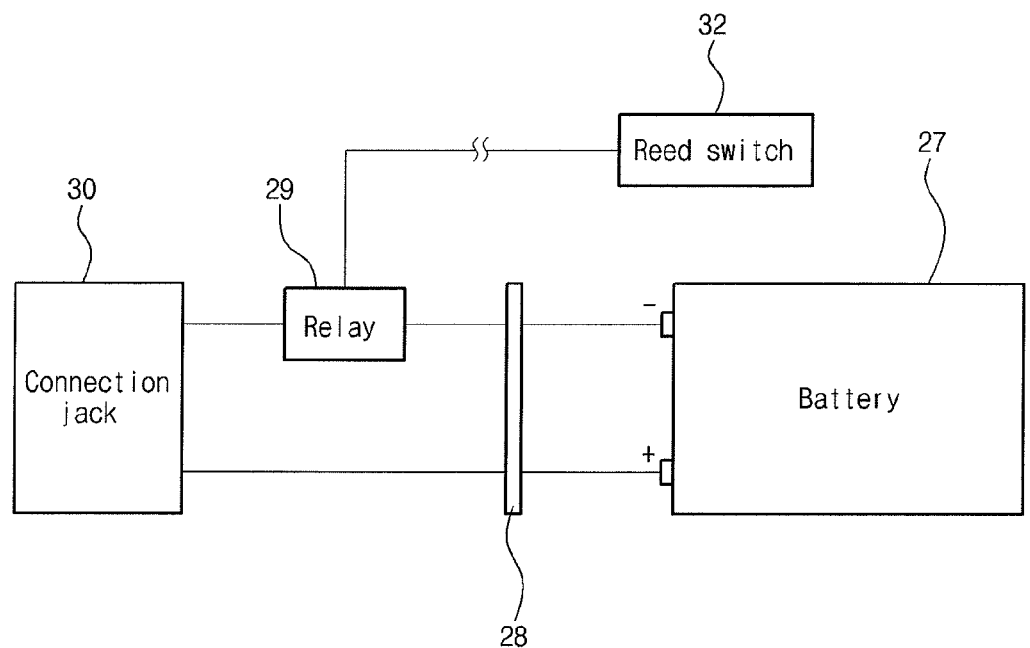
FIG. 6 is a diagram illustrating current flow of a power supplier of FIG. 1.

FIG. 5 is a cross-sectional view taken along line A-A of FIG. 1 for illustrating an on/off operation of a safety means of FIG. 1, and FIG. 6 is a diagram illustrating current flow of the power supplier 26 of FIG. 1.

An embodiment of the present invention provides a safety means installed at the bottom of the main body 10 to prevent current from flowing from the power supplier 26 to the cable 25, and thus it is possible to prevent other parts from being damaged due to an overload of the motor 11 and prevent unnecessary power consumption and safety accident due to current flow between the inside of the main body 10 and the cable 25.

For this purpose, the safety means includes a fixing tube 24 installed at the bottom of the main body 10 and a rotating ring 23 rotatably supported on the outer surface of the fixing tube 24. The fixing tube 24 includes a guide groove formed in the circumferential direction such that the rotating ring 23 can rotate along the guide groove.

An iron portion 31a and a magnetic portion 31b are installed on the circumference of each of the fixing tube 24 and the rotating ring 23 at a predetermined interval, e.g., at an interval of 180 degrees. Moreover, a reed switch 32 formed of a conductive material is installed on the inner side (with respect to the radial direction) adjacent to the iron portion 31a of the fixing tube 24 and connected to the relay 29 of the power supplier 26.

In this case, the negative pole of the battery 27 in the power supplier 26 is connected to the substrate 28, the relay 29, and the connection jack 30 by a first cable, and the positive pole of the battery 27 is connected to the substrate 28 and the connection jack 30 by a second cable.

The operational state of the safety means having the above-described configuration will be described below.

The rotating ring 23 can be rotated left and right by a worker as occasion demands. For example, when the rotating ring 23 is rotated 180 degrees in one direction, the magnetic portion 31b of the rotating ring 23 is attached to the iron portion 31a of the fixing tube 24, and the iron portion 31a of the rotating ring 23 is attached to the magnetic portion 31b of the fixing tube 24. As a result, the magnetic portion 31b of the rotating ring 23 connects contact points of the reed switch 32, installed adjacent to the iron portion 31a of the fixing tube 24, to each other by the magnetic force, and thus the reed switch 32 is turned on.

Therefore, the relay 29 is turned on by an ON signal of the reed switch 32, and the power of the battery is supplied to the motor 11 of the main body 10 via the cable 25. The rotational force generated by the motor 11 is transmitted to the movable blade 14 via a gear to automatically move the movable blade 14, thus performing the pruning operation.

On the contrary, when the rotating ring 23 is rotated 180 degrees in the other direction or in the same direction, the magnetic portion 31b of the rotating ring 23 is attached to the magnetic portion 31b of the fixing tube 24, and the iron portion 31a of the rotating ring 23 is attached to the iron portion 31a of the fixing tube 24. As a result, the magnetic portion 31b of the rotating ring 23 is separated from the reed switch 32 installed adjacent to the iron portion 31a of the fixing tube 24 such that the magnetic force is not applied, and thus the reed switch 32 is turned off.

Therefore, the relay 29 is turned off by an OFF signal of the reed switch 32, and the power of the battery is not applied to the cable 25. As a result, it is possible to prevent unnecessary power consumption and safety accident due to current flow between the main body 10 and the cable 25 occurring even in the case where the electric pruning operation is not performed.

The use state of the electric pruning shears having the above-described configuration will be described below.

As shown in FIGS. 1 and 2, during the pruning operation on fruit trees such as pear trees, apple trees, persimmon trees, grapevines, or strong trees such as tangerine trees, orange trees, citron trees, etc., the worker puts the ring-shaped portable operating switch 20 on his or her finger and brings the switch 20 into contact with the contact switch 33 mounted in the main body 10, the movable contact 33a of the contact switch 33 is attached to the fixed contact 33b by the magnetic force and, at the same time, power is supplied to the motor 11 to be operated.

That is, the motor 11 is rotated in the forward direction.

The operation of the motor 11 causes operation of the decelerator 12 and engagement between the drive gear 15 and the gear portion 16 of the movable blade 14, and thus the movable blade 14 rotates with respect to the hinge pin 38 as a central axis. As a result, the movable blade 14 can cut a branch of a fruit tree together with the fixed blade 13.

In this case, the motor 11 repeats the forward and reverse rotations, and thus the movable blade 14 also repeats the forward or reverse rotation, thus performing the pruning operation together with the fixed blade 13.

Of course, while the portable operating switch 20 put on the finger is brought into contact with the contact switch 33, the repeated forward and reverse rotations of the motor 11 are basically performed one time.

According to an embodiment of the present invention, while the portable operating switch 20 is brought into contact with the contact switch 33 mounted in the main body 10, the repeated forward and reverse rotations may be performed several times. At the very moment when the portable operating switch 20 is separated from the contact switch 33, the operation of the motor 11 may be stopped, and thus the operation of the movable blade 14 can be stopped.

Figure 7:
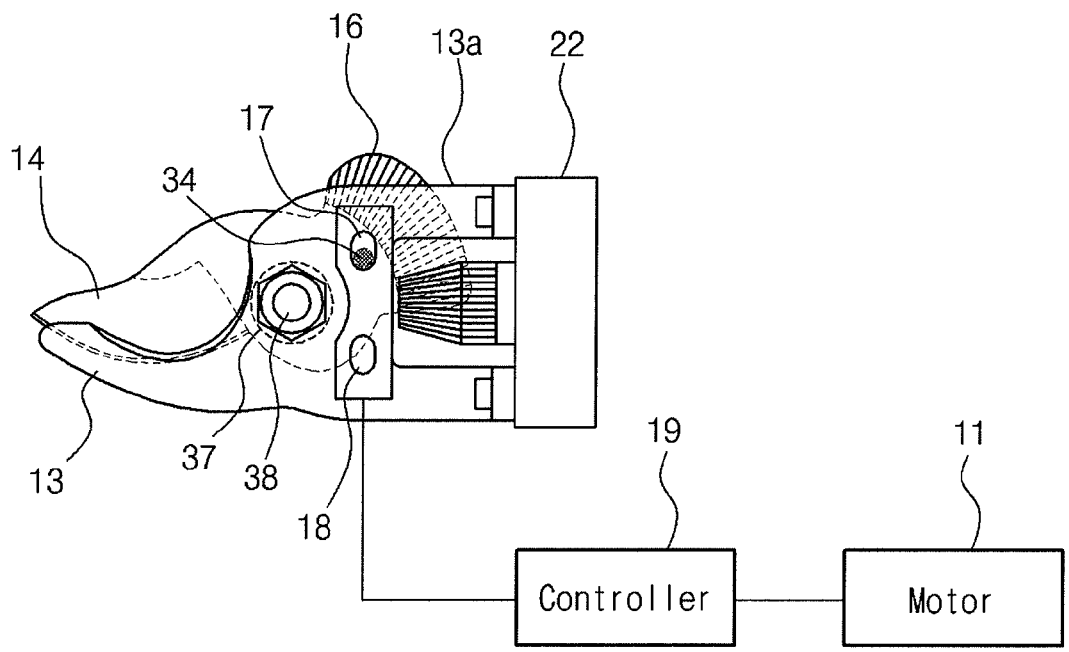
FIGS. 7 and 8 are diagrams illustrating a one-time reciprocating rotation of a movable blade using a first hall sensor and a second hall sensor of FIG. 1.
Figure 8:
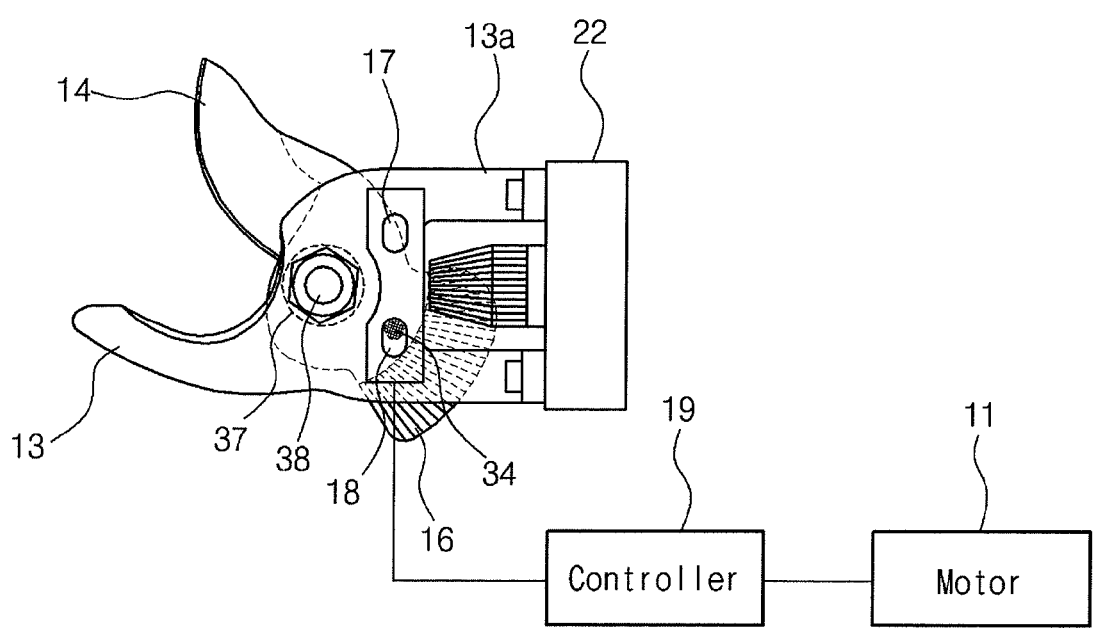

FIGS. 7 and 8 are diagrams illustrating a one-time reciprocating rotation of the movable blade 14 using first and second hall sensors 17 and 18 of FIG. 1.

According to another embodiment of the present invention, a rotating magnet 34 is inserted into the gear portion 16 of the movable blade 14, and the first and second hall sensors 17 and 18 capable of detecting a position of the rotating magnet 34 are installed on the fixed blade 14 such that the movable blade 14 can be reciprocated only once when the portable operating switch 20 is brought into contact with the contact switch 33.

In this case, the first and second hall sensors 17 and 18 are installed at an upper end of the leg portion of the fixed blade 13 to correspond to both ends of the rotation radius of the rotating magnet 34 installed at the gear portion 16 of the movable blade 14.

For example, when the rotating magnet 34 is moved to the first hall sensor 17 and detected by the first hall sensor 17, the controller 19 and the power supplier 26 receive a detection signal from the first hall sensor 17 and send a rotation control signal to the motor 11 to be rotated in the reverse direction, thus opening the movable blade 14.

On the contrary, when the rotating magnet 34 is moved to the second hall sensor 18 and detected by the second hall sensor 18, the controller 19 and the power supplier 26 receive a detection signal from the second hall sensor 18 and send a stop control signal to the motor 11 such that the operation of the movable blade 14 is stopped in an opened state.

According to the above embodiment, the motor 11 may be repeatedly operated several times while the portable operating switch 20 is brought into contact with the contact switch 33 by changing the circuit of the substrate, and the movable blade 14 may be reciprocated only once when the portable operating switch 20 is attached to and detached from the main body 10 using the hall sensors 17 and 18.

According to another embodiment, the movable blade 14 may be in a closed state when the portable operating switch 20 is brought into contact with the contact switch 33 for a predetermined time, for example, 3 to 4 seconds by changing the circuit of the substrate. In this case, the movable blade 14 may be operated by controlling the motor 11 by detecting the position of the movable blade 14 using the hall sensors 17 and 18.

Here, as the method of electrically controlling the forward and reverse rotations of the motor 11, any electrical control method employed in the general electric pruning shears may be used without limitation.

As described above, according to the electric pruning shears of the present invention, with the use of a strong driving force of a motor during a pruning operation, it can show excellent performance during the pruning operation on all kinds of fruit trees such as strong trees such as tangerine trees, orange trees, etc. as well as pear trees, apple trees, etc. Moreover, since a switch for operating the electric pruning shears is formed as a separate part capable of being put on a user's finger, it is possible to ensure safety and reduce the volume and weight of the electric pruning shears.

With the miniaturization and lightweight of the electric pruning shears, it is possible to improve operation convenience by increasing the operating speed and eliminating hand fatigue during the pruning operation.

Moreover, since an abnormality such as an overload of the motor occurring during the pruning operation can be eliminated, it is possible to prevent the motor from being damaged, thus improving the durability of the electric pruning shears.

Furthermore, since a rotating ring having a magnet mounted therein is installed at the bottom of a main body of the electric pruning shears such that a power supplier supplies power of a battery to the motor by the operation of the rotating ring during the pruning operation and the power supplier cuts off the power supply during non-use of the electric pruning shears, it is possible to prevent unnecessary power consumption.

In addition, by detecting the operation of a movable blade through hall sensors, the movable blade can be reciprocated only once when a portable operating switch is attached to and separated from a contact switch, and the movable blade is in a closed state when the portable operating switch is brought into contact with the contact switch for a predetermined time during non-use, thus improving the operation convenience.

Additionally, since a control box configured separately from the main body of the electric pruning shears in the prior art is mounted in the main body, it is possible to reduce the overall volume and weight of the electric pruning shears, thus facilitating the transport and custody.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A pruning assembly comprising an electric shears and a portable operating contact ring, the electric shears including a fixed blade and a movable blade and performing a pruning operation by operating the movable blade by a driving force of a motor, a contact switch installed on one side of a main body to operate the motor and including a movable contact and a fixed contact; and the portable operating contact ring having a ring shape capable of being put on a user's finger and including a magnet to operate the motor by connecting the movable contact and the fixed contact of the contact switch by a magnetic force of the magnet, the electric shears further comprising a rotating magnet inserted into one side of the movable blade, and first and second hall sensors attached on a rear end of the fixed blade at a regular interval to detect a position of the rotating magnet, wherein the first hall sensor detects a closed state of the movable blade and the second hall sensor detects an opened state of the movable blade, thus controlling a one-time reciprocating rotation of the movable blade.

2. The electric pruning shears of claim 1, wherein the movable contact of the contact switch includes a return spring returning the movable contact to its original position from the fixed contact when no magnetic force is applied.

3. The electric pruning shears of claim 1, wherein the movable blade is rotatably connected to one side of the fixed blade by a hinge pin while forming a pair with the fixed blade on the main body and is operated when engaged with a drive gear of the motor through a fan-shaped gear portion formed at a rear end of the movable blade, thus performing the pruning operation.

4. The electric pruning shears of claim 1, further comprising a sensor installed in the connection region of the hinge pin of the movable blade to detect a load applied to the movable blade, thus preventing the motor from being overloaded.

5. The electric pruning shears of claim 4, wherein the sensor is a load cell capable of detecting the magnitude of a load as an electrical signal by measuring a change in resistance.

6. The electric pruning shears of claim 1, further comprising a fixing tube installed at the bottom of the main body, a rotating ring supported on the outer surface of the fixing tube to rotate on a concentric circle, and a reed switch turned on or off by a magnetic force of the rotating ring.

7. The electric pruning shears of claim 1, wherein each of the fixing tube and the rotating ring includes an iron portion and a magnetic portion installed on the circumference at a predetermined interval, and the reed switch is located adjacent to the iron portion of the fixing tube and turned on or off according to whether the magnetic portion of the rotating ring overlaps the iron portion of the fixing tube.

8. The electric pruning shears of claim 6, further comprising a power supplier connected to the main body via a cable and including a battery mounted therein, and a relay receiving a signal from the reed switch to supply or cut off power to the cable.

9. The electric pruning shears of claim 1, further comprising a controller mounted in the main body and controlling the entire operation of the motor and the power supply to the motor.

10. The electric pruning shears of claim 1, wherein the closed state of the movable blade and the fixed blade is maintained by bringing the portable operating switch into contact with the contact switch for a predetermined time during nonuse.

11. Electric pruning shears comprising a fixed blade and a movable blade and performing a pruning operation by operating the movable blade by a driving force of a motor,
a hall sensor switch installed on one side of a main body to operate the motor; and
a portable operating switch including a magnet mounted therein and turned on when the portable operating switch is brought into contact with the hall sensor switch, thus operating the motor by a magnetic force of the magnet, the electric shears further comprising
a rotating magnet inserted into one side of the movable blade, and first and second hall sensors attached on a rear end of the fixed blade at a regular interval to detect a position of the rotating magnet, wherein the first hall sensor detects a closed state of the movable blade and the second hall sensor detects an opened state of the movable blade, thus controlling a one-time reciprocating rotation of the movable blade.

12. The electric pruning shears of claim 3, further comprising a sensor installed in the connection region of the hinge pin of the movable blade to detect a load applied to the movable blade, thus preventing the motor from being overloaded.

* * * * *